United States Patent [19]

Schrader

[11] 4,175,847
[45] Nov. 27, 1979

[54] SHUTTER-CONTROL MECHANISM FOR BELLOWS CAMERA

[75] Inventor: Goetz Schrader, Frankfurt am Main, Fed. Rep. of Germany

[73] Assignee: Plaubel, Feinmechanik & Optik GmbH, Frankfurt am Main, Fed. Rep. of Germany

[21] Appl. No.: 831,279

[22] Filed: Sep. 7, 1977

[30] Foreign Application Priority Data

Sep. 8, 1976 [DE] Fed. Rep. of Germany ....... 2640434

[51] Int. Cl.² .............................................. G03B 17/04
[52] U.S. Cl. ................................................... 354/187
[58] Field of Search ......................... 354/204, 208, 187

[56] References Cited

U.S. PATENT DOCUMENTS

| 1,110,116 | 9/1914 | Dietz | 354/208 |
| 2,813,470 | 11/1957 | Meixner | 354/204 |

FOREIGN PATENT DOCUMENTS

| 898112 | 10/1953 | Fed. Rep. of Germany | 354/187 |
| 900333 | 6/1945 | France | 354/204 |

Primary Examiner—John Gonzales
Attorney, Agent, or Firm—Montague & Ross

[57] ABSTRACT

A bellows camera having a housing movably connected with its lens mount by a scissor linkage has a shutter with a spring-loaded setting ring carried on the lens mount, the setting ring being mechanically coupled with a wind-up lever on the camera housing through a gear train whose gears are carried on the legs of a knee joint articulated to the housing and to the lens mount. The housing-side end of the gear train is connected with the wind-up lever through a lost-motion coupling and is provided with a detent holding the setting ring in its cocked position until disengaged by the shutter release.

15 Claims, 10 Drawing Figures

FIG. 5A
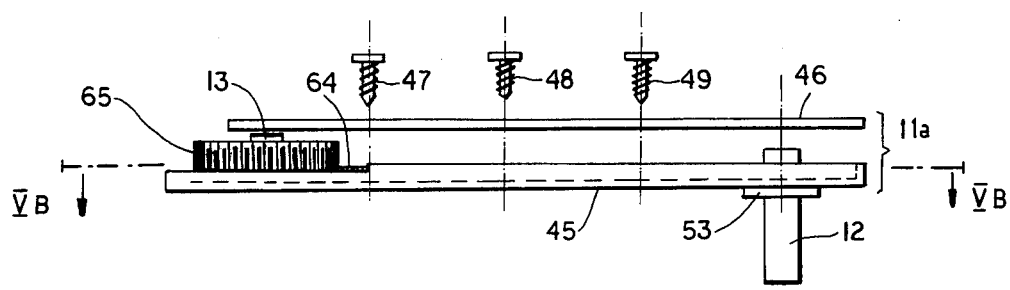
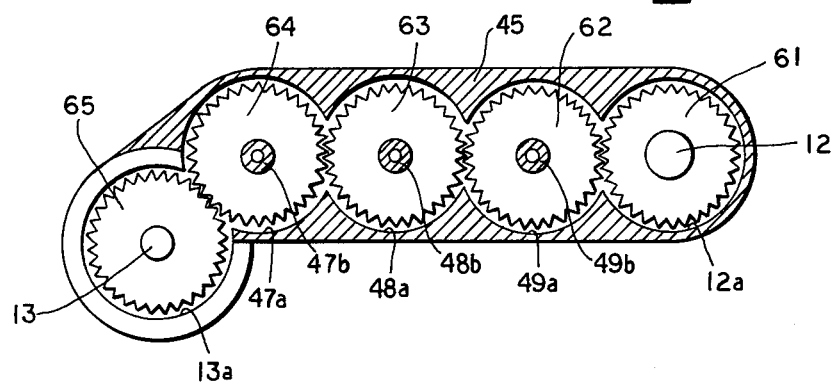
FIG. 5B
FIG. 6B
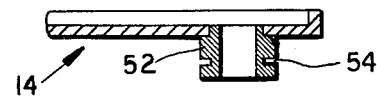
FIG. 6A
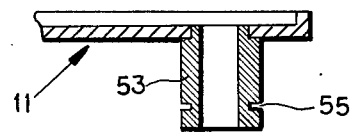

SHUTTER-CONTROL MECHANISM FOR BELLOWS CAMERA

FIELD OF THE INVENTION

My present invention relates to a photographic camera of the collapsible type whose housing, designed to accommodate a film to be exposed, is connected with a movable lens mount, carrying the exposure objective, through an extendible linkage allowing the distance of the objective from the film plane to be adjusted for focusing purposes by varying the separation of the lens mount from the housing. Generally, a bellows is inserted between the lens mount and the housing to form a lighttight enclosure between the objective and the film chamber.

BACKGROUND OF THE INVENTION

As is known, the lens mount of such a bellows camera also carries a shutter which is centered on the optical axis of the objective and can be cocked with the aid of a spring-loaded setting ring. To release the shutter from its cocked position, a trigger such as a pushbutton must be actuated. Conventionally, the trigger is disposed on the lens mount where it can be operatively coupled with the setting ring by a simple mechanical transmission.

Thus, a user holding the camera housing in one hand must reach around the lens mount with the other hand in order to cock and release the shutter. This mode of operation is awkward and introduces an element of unsteadiness liable to impair the quality of the picture.

OBJECT OF THE INVENTION

The object of my present invention, therefore, is to provide more readily accessible means in such a camera for operating a shutter or, for that matter, any other exposure-control member situated on the lens mount.

SUMMARY OF THE INVENTION

In realizing this object, in accordance with my present invention, by the provision of actuating means on the housing operatively connected with the associated exposure-control member by a gear train supported on a part of the extendible linkage which connects the lens mount with the housing.

In the specific case here contemplated, where the exposure-control member is a setting ring for a shutter, the actuating means may comprise a wind-up lever connected with the gear train via a lost-motion coupling, the gear train being arrestable in the cocked position by detent means adapted to be disengaged therefrom by the operation of a shutter release on the camera housing.

Advantageously, pursuant to another feature of my invention, the part of the extendible linkage supporting the gear train is a knee joint with first and second hingedly interconnected legs of equal length respectively articulated at one end to the housing and to the lens mount. The articulated end of the first leg carries a driving gear which is of the same size as a driven gear on the articulated end of the second leg, the train further including a middle gear—also of the same size—centered on the hinge axis of the legs as well as an even number of intermediate gears symmetrically disposed therebetween. Thus, the total number of gears in the train is odd.

Such a gear train allows the knee joint to be moved between an extended position and a retracted position without changing the relative rotation of an input shaft and an output shaft respectively keyed to the driving and the driven gear. The shutter operation is, accordingly, independent of the focusing of the camera objective by a relative displacement of its housing and its lens mount along the optical axis.

BRIEF DESCRIPTION OF THE DRAWING

The above and other features of my invention will now be described in detail with reference to the accompanying drawing in which:

FIG. 5A is an exploded side view of a leg of the knee joint shown in FIGS. 4A and 4B;

FIG. 5B is a sectional view taken on the line VB—VB of FIG. 5A';

FIG. 6A is a sectional detail view of an extremity of the leg shown in FIGS. 5A and 5B; and FIG. 6B is a view similar to FIG. 6A, showing an extremity of the other leg of the knee joint.

SPECIFIC DESCRIPTION

Figure 1:
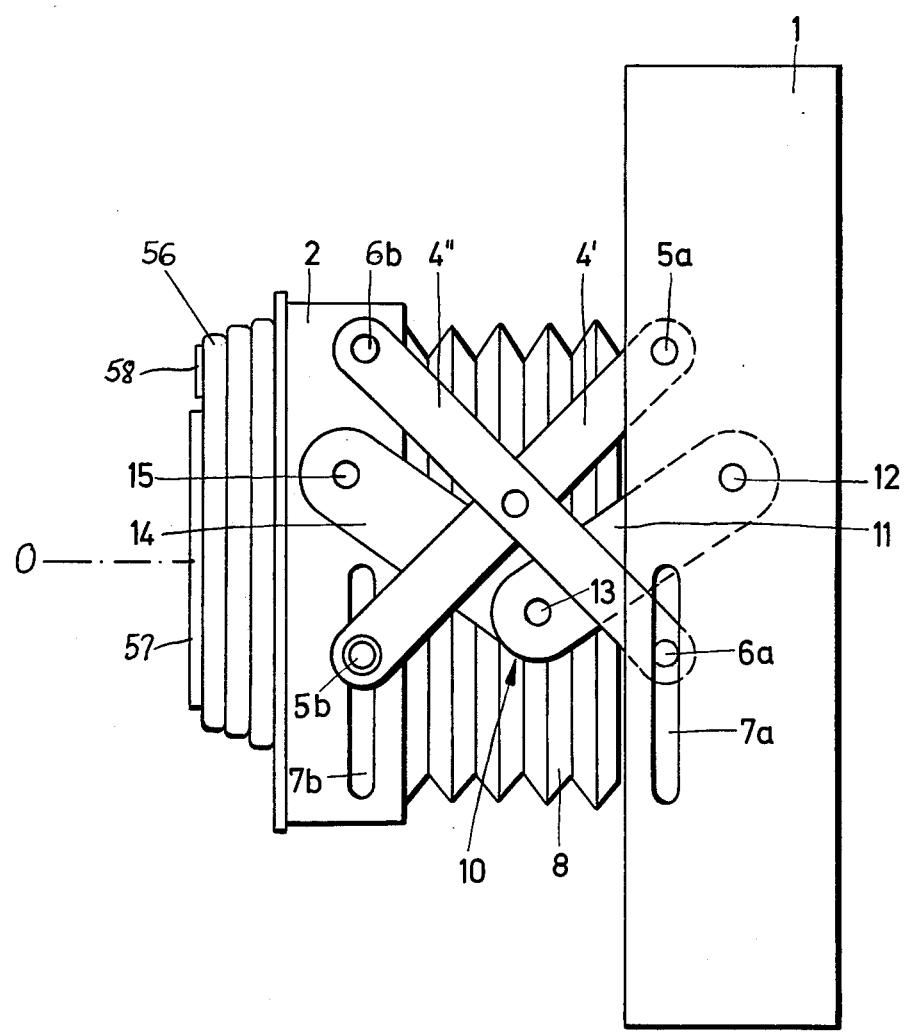
FIG. 1 is a top view of a bellows camera embodying my invention.

In FIG. 1 I have shown a collapsible camera comprising a housing 1 and a lens mount 2 interconnected by a bellows 8 as well as by an articulated linkage which includes two pairs (only one shown) of pivotally interconnected scissor arms 4' and 4". Another part of that linkage is a knee joint 10 formed from two legs 11 and 14 of equal length pivotally interconnected by a hinge pin 13; leg 11 is pivotable on housing 1 about the axis of an input shaft 12 while leg 14 is similarly pivotable on lens mount 2 about the axis of an output shaft 15. The arm 4' of each scissor link has one end articulated to housing 1 by a pivot pin 5a and carries at its opposite end a pin 5b which is slidable in a guide slot 7b of lens mount 2. In an analogous manner, arm 4" has one end articulated to lens mount 2 by a pivot pin 6b and carries at its opposite end a pin 6a slidable in a guide slot 7a of housing 1.

The two scissor links 4', 4", respectively located above and below the bellows 8, may by displaceable by a knob-controlled adjusting mechanism as described in my copending applications Ser. No. 831,267, 831,272 and 831,265 of even date whose disclosures are hereby incorporated by reference into the present application.

Lens mount 2 carries a board 56 for an objective 39 (FIG. 2) whose optical axis is shown at 0. Lens board 56 supports a shutter mechanism 3, more fully described hereinafter. Next to the objective 39, the lens board carries a window 58 (omitted in FIG. 2) for an electric eye of a photometer.

Figure 2:
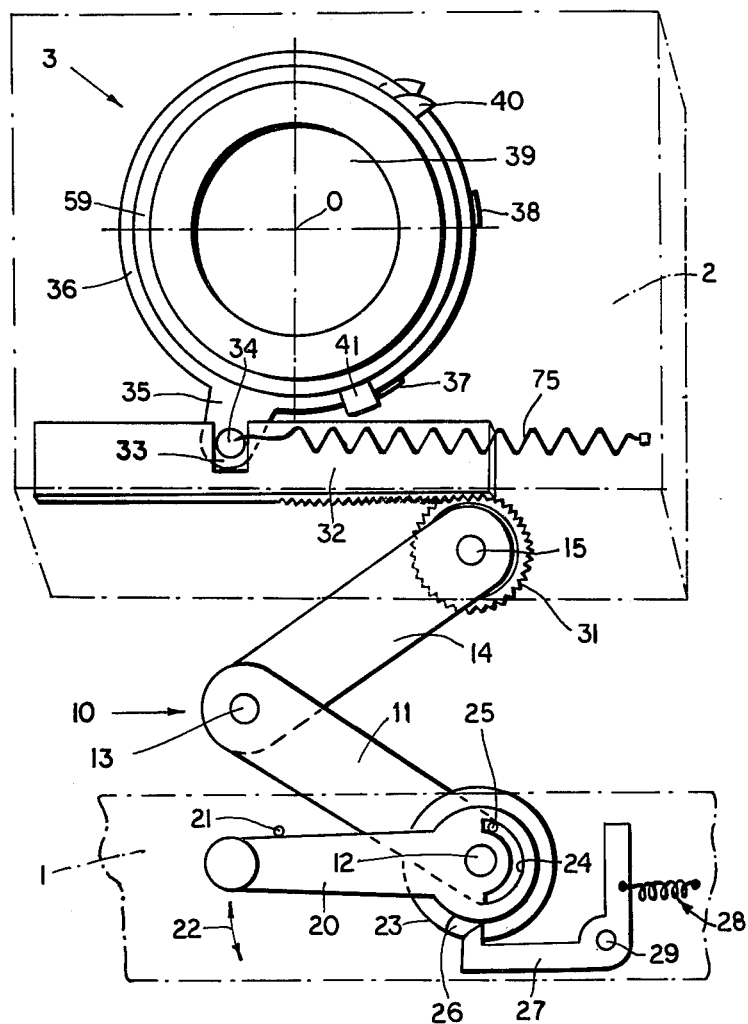
FIG. 2 is a somewhat diagrammatic perspective view of a shutter-control mechanism according to my invention on the camera of FIG. 1.

The shutter mechanism 3 illustrated in FIG. 2 comprises a setting ring 36 centered on axis 0 which is coupled with the shutter proper, designated 59, in the conventional manner and is rotatable in a clockwise direction into its illustrated cocked position against the force of a biasing spring 75 tending to restore it to a normal position. Spring 75 is anchored to a lug 35 of ring 36 which also carries a pin 34 engaging in a notch 33 of a rack member 32 meshing with a pinion 31. Ring 36 further carries a pair of lugs 37 and 38, lug 37 coacting with a dog 41 of shutter 59 to wind it up during clockwise rotation whereas lug 38 is engageable with a tooth 40 on the return stroke to release the cocked shutter.

Pinion 31, keyed to output shaft 15, is the last member of a gear train lodged within legs 11 and 14 of knee joint 10, that gear train being driven by the input shaft 12 which is rigid with a disk 23. A wind-up lever 20 is freely swingable on shaft 12, as indicated by an arrow 22, and is connected with disk 23 via a lost-motion coupling which includes a pin 25 on the disk engaging in a semicircular slot 24 on a hub portion of the lever. The latter is urged by a nonillustrated spring against a fixed stop 21. Disk 23 has a peripheral notch 26 engageable by a pawl 27 which is fulcrumed to the housing by a pin 29 and is biased by a spring 28 into its illustrated detent position. Thus, a disengagement of pawl 27 from disk 23 by direct manual actuation, or with the aid of a nonillustrated trigger, allows the disk to rotate clockwise under the force of spring 75 on account of the positive coupling of that disk with ring 36 via rack-and-pinion assembly 31, 32 and the gear train within knee joint 10. The return of setting ring 36 to normal, with a tripping of tooth 40 to release the shutter, coincides with a rotation of disk 23 within the limits of slot 24. Prior to taking the next picture, therefore, the user will rotate the wind-up lever 20 once more in a counterclockwise direction until the disk is re-engaged by the detent 27; this actuation of lever 20 may also advance the film in the camera housing by one frame as is well known per se.

The deactivation of the detent 26, 27 could also be carried out with the aid of a pushbutton seated in a focusing knob which controls the scissor linkage 4', 4", as described in my copending application Ser. No. 831,272 referred to above. That copending application further shows that such a release can be blocked in the collapsed position of the camera, i.e., with the lens mount 2 received in housing 1.

Figure 3B:
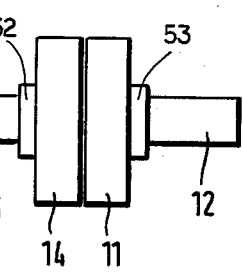
FIG. 3B is an end view of the retracted knee joint shown in FIG. 3A.
Figure 3A:
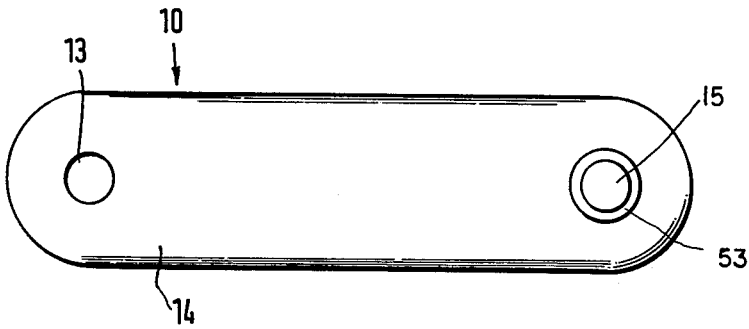
FIG. 3A is a face view of a knee joint forming part of that mechanism shown in retracted position.

In FIGS. 3A and 3B I have shown the two legs 11 and 14 of knee joint 10 in the collapsed state of the camera, these legs being of identical shape and overlying each other with their shafts 12 and 15 projecting in opposite directions therefrom by way of respective nipples 53 and 52.

Figure 4B:
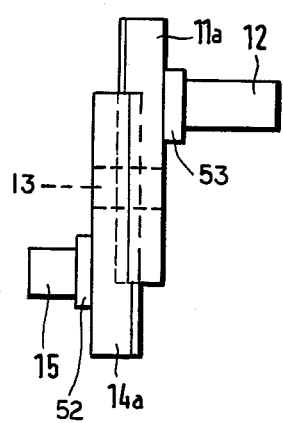
FIG. 4B is an end view of the knee joint shown in FIG. 4A.
Figure 4A:
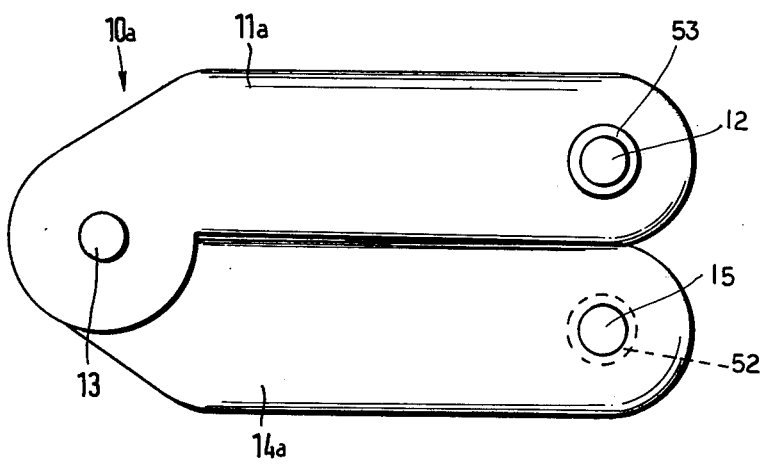
FIG. 4A is a view similar to FIG. 3A, showing a modified knee joint.

A modified knee joint 10a, occupying less space in the transverse direction, is shown in FIGS. 4A and 4B. There the two legs 11a and 14a are no longer symmetrical about a longitudinal midplane including the axis of their hinge pin 13, as is true of the assembly of FIGS. 3A and 3B, but terminate in laterally offset portions which are overlappingly interconnected by the pin 13 so that the shanks of legs 11a and 14a lie alongside each other in the collapsed state.

FIGS. 5A and 5B show details of the gear train accommodated within the knee joint, with particular reference to the leg 11a of joint 10a. Input shaft 12 carries a driving gear 61 lodged in a nearly circular recess 12a of a shallow casing 45 constituting the major part of leg 11a. Three other such recesses 49a, 48a, and 47a accommodate respective intermediate gears 62, 63 and 64 meshing with one another and with a middle gear 65 of more than twice the axial height of the remaining gears; this middle gear 65, centered on hinge pin 13, is lodged in a cutout 13a formed in the aforementioned laterally offset leg portion. A cover is attached to the upwardly open casing 45 with the aid of screws 47, 48 and 49, threaded into respective studs 47b, 48b and 49b on which the gears 64, 63 and 62 are journaled, the cover 46 being cut away above recess 13a so that the tall middle gear 65 can project past the cover into a corresponding recess of the companion leg 14a. The four remaining gears of the train, including a driven gear keyed to output shaft 15, are identical in appearance with gears 61-64 and have therefore not been separately illustrated. Leg 14a, of course, is a symmetrical duplicate of leg 11a. Hinge pin 13 is journaled in the casings 45 of both legs. At least the middle gear 65, the driving gear 61 and its driven counterpart are of identical radius and number of teeth.

Legs 11 and 14 of FIGS. 3A and 3B are, of course, similarly split into a casing and a partly cut-away cover.

In FIG. 6A I have shown the nipple 53, which may be secured to the extremity of leg 11 (or 11a) by riveting, as provided with an annular groove 55 which can receive an O-ring designed to hold the leg in position on a wall of housing 1 penetrated by that nipple. Similarly, nipple 52 of leg 14 (or 14a) has been shown in FIG. 6B as having a peripheral groove 54 for such purpose analogous attachment to a wall of lens mount 2. These two nipples, which act as the pivots of their respective legs, could be of different length as likewise seen in FIGS. 6A and 6B.

It will be apparent that the gear transmission described above could also be used for the adjustment of an exposure-control member other than a shutter, e.g. an iris diaphragm.

I claim:
1. A camera comprising:
a housing adapted to receive a photographic film to be exposed;
a lens mount provided with an objective centered on an optical axis, said lens mount being receivable in said housing in a collapsed position and being axially separable therefrom for movement into a picture-taking position;
an extendible linkage interconnecting said lens mount and said housing, said linkage including a knee joint with first and second hingedly interconnected legs of equal length having ends respectively articulated to said housing and to said lens mount;
a bellows forming a lighttight enclosure between said lens mount and said housing;
an exposure-control member on said lens mount in line with said objective;
actuating means on said housing for operating said member; and
a gear train operatively connecting said member with said actuating means, said gear train being supported on a part of said linkage, said gear train including a driving gear on the articulated end of said first leg, and driven gear on the articulated end of said second leg, a middle gear of the same size as said driving and driven gears centered on the hinge axis of said legs, and an even number of intermediate gears between said middle gear and said driving and driven gears, said intermediate gears being symmetrically disposed on said legs.

2. A camera as defined in claim 1 wherein said objective is provided with a shutter centered on said axis, said member being a ring coaxial with said objective and rotatable between a normal position and a cocked position, further comprising spring means biasing said ring into its normal position.

3. A camera as defined in claim 2 wherein said gear train is provided with an output shaft journaled on said lens mount, further comprising a pinion on said output shaft and a rack coupled with said ring for entraining the latter against the force of said spring means during a wind-up stroke of said actuating means, said shutter being provided with a trigger and with a wind-up tooth, said ring being provided with lug means engageable with said tooth during said wind-up stroke and with said trigger during a return stroke.

4. A camera as defined in claim 1 wherein each of said legs is in the form of a shallow casing with a bottom perpendicular to said hinge axis, said middle gear being received in the casings of both legs, half of the remaining gears of said gear train being received in the casing of said first leg, the other half of the remaining gears being received in the casing of said second leg.

5. A camera as defined in claim 4 wherein each casing is elongate and substantially symmetrical about a longitudinal midplane including said hinge axis, said legs overlying each other in said collapsed position.

6. A camera as defined in claim 4 wherein each casing is elongated and terminates in a laterally offset portion accommodating said middle gear, said legs lying alongside each other in said collapsed position.

7. A camera comprising:
a housing adapted to receive a photographic film to be exposed;
a lens mount carrying an objective centered on an optical axis, said objective being provided with a shutter centered on said axis, said lens mount being receivable in said housing in a collapsed position and being axially separable therefrom for movement into a picture-taking position;
an extendible linkage interconnecting said lens mount and said housing;
a bellows forming a lighttight enclosure between said lens mount and said housing;
an exposure-control ring on said lens mount coaxial with said objective and rotatable between a normal position and a cocked position;
spring means biasing said ring into its normal position;
actuating means on said housing including a wind-up lever connected with said train via a lost-motion coupling for rotating said ring into said cocked position, detent means engageable with said gear train for retaining said ring in said cocked position, and shutter-release means operable to disengage said detent means; and
a gear train operatively connecting said ring with said actuating means, said gear train being supported on a part of said linkage.

8. A camera as defined in claim 7 wherein said gear train is provided with an input shaft journaled on said housing, said lost-motion coupling comprising a disk on said input shaft and a pin-and-slot connection between said disk and said lever.

9. A camera as defined in claim 8 wherein said detent means comprises a pawl engageable in a notch of said disk.

10. A camera as defined in claim 7 wherein said part of said linkage is a knee joint with first and second hingedly interconnected legs of equal length with ends respectively articulated to said housing and to said lens mount, said gear train comprising a driving gear on the articulated end of said first leg, a driven gear on the articulated end of said second leg, a middle gear of the same size as said driving and driven gears centered on the hinge axis of said legs, and an even number of intermediate gears between said middle gear and said driving and driven gears, said intermediate gears being symmetrically disposed on said legs.

11. A camera as defined in claim 10 wherein each of said legs is in the form of a shallow casing with a bottom perpendicular to said hinge axis, said middle gear being received in the casings of both legs, half of the remaining gears of said gear train being received in the casing of said first leg, the the half of the remaining gears being received in the casing of said second leg.

12. A camera as defined in claim 11 wherein each casing is elongate and substantially symmetrical about a longitudinal midplane including said hinge axis, said legs overlying each other in said collapsed position.

13. A camera as defined in claim 11 wherein each casing is elongate and terminates in a laterally offset portion accommodating said middle gear, said legs lying alongside each other in said collapsed position.

14. A camera comprising:
a housing adapted to receive a photgraphic film to be exposed;
a lens mount carrying an objective centered on an optical axis, said objective being provided with a shutter centered on said axis, said lens mount being receivable in said housing in a collapsed position and being axially separable therefrom for movement into a picture-taking position;
an extendible linkage interconnecting said lens mount and said housing;
a bellows forming a lighttight enclosure between said lens mount and said housing;
an exposure-control ring on said lens mount coaxial with said objective and rotatable between a normal position and a cocked position;
spring means biasing said ring into its normal position;
actuating means on said housing for operating said member;
a gear train operatively connecting said member with said actuating means, said gear train being supported on a part of said linkage and being provided with an output shaft journaled on said lens mount;
a pinion on said output shaft; and
a rack coupled with said ring for entraining the latter against the force of said spring means during a wind-up stroke of said actuating means, said shutter being provided with a trigger and with a wind-up tooth, said ring being provided with lug means engageable with said tooth during said wind-up stroke and with said trigger during a return stroke.

15. A camera as defined in claim 14 wherein said actuating means comprises a wind-up lever connected with said train via a lost-motion coupling for rotating said ring into said cocked position, detent means engageable with said gear train for retaining said ring in said cocked position, and shutter-release means operable to disengage said detent means.

* * * * *